Figure 1:
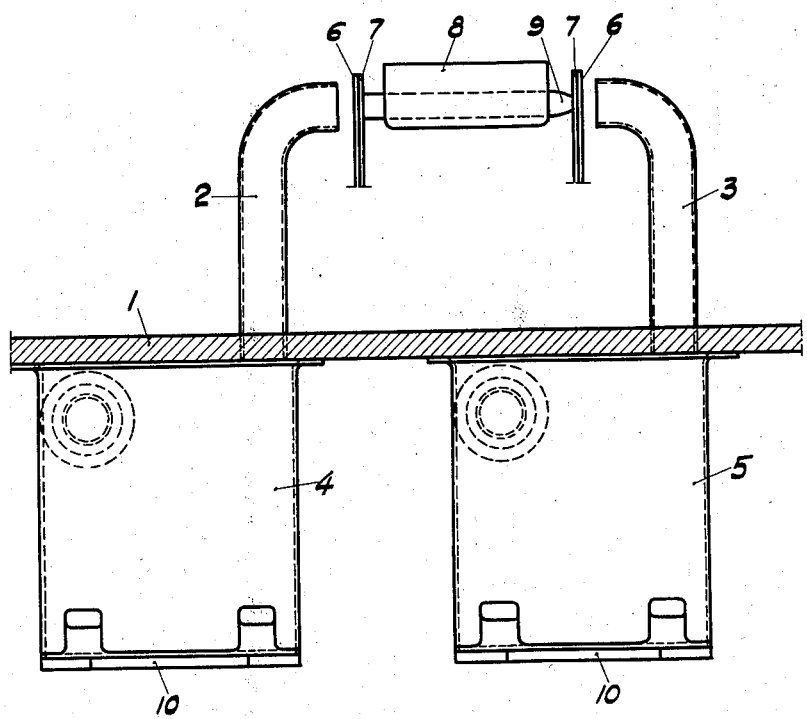

Jan. 1, 1935.  K. E. GRANSTEDT  1,986,725
DEVICE FOR TRANSPORTING CLIPPINGS OF CIGARS AND THE LIKE
Filed Oct. 30, 1931  2 Sheets-Sheet 1

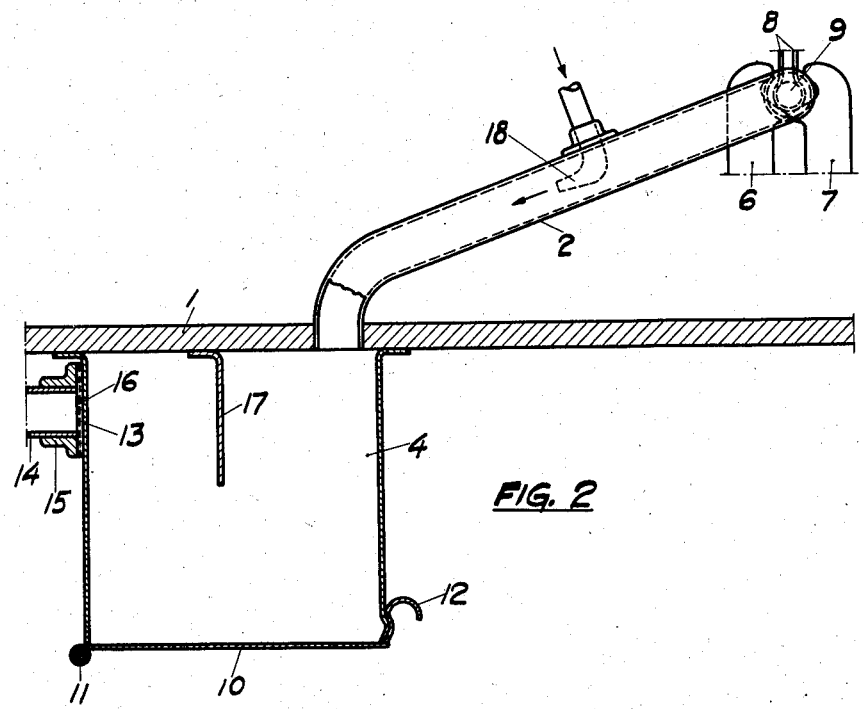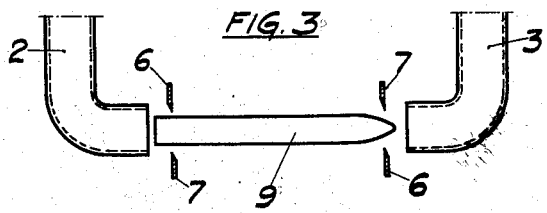

Patented Jan. 1, 1935

1,986,725

UNITED STATES PATENT OFFICE 1,986,725

DEVICE FOR TRANSPORTING CLIPPINGS OF CIGARS AND THE LIKE

Karl Erik Granstedt, Stockholm, Sweden, assignor to Aktiebolaget Formator, Stockholm, Sweden, a Swedish joint-stock company Application October 30, 1931, Serial No. 572,180
In Sweden April 10, 1931

1 Claim. (Cl. 131—37)

The present invention relates to a method of and device for transporting clippings of cigars, cigarillos or bunches from cutting devices to containers in cigar machines of the type in which the cigar etc. during the manufacturing is cut at one or both ends to a predetermined length.

In hitherto known devices for the purpose mentioned above, there have been used inclined chutes along which the clippings fall down and thus are transported away from the cutting device. Such chutes encroach, however, too much upon the space in the machine which is a serious inconvenience, especially in cigar machines. Moreover, it is difficult to effect a sufficient inclination of the chutes from the cutting devices to the containers. Therefore, the chutes often are clogged by the clippings.

Moreover, when cigars etc. are to be cut at both ends, said ends must be supplied with paste, and therefore it has been difficult and even impossible to use chutes such as mentioned above, because the clippings in such case do not fall down, as the paste attaches said clippings even to vertical surfaces.

This disadvantage is eliminated by the present invention. The invention is principally characterized in that the transporting of the clippings is effected by means of an air-current.

In a preferred embodiment of the invention such an air-current is effected by vacuum at the delivery end of the transporting tubes, which lead from the cutting devices to the containers, where the clippings are collected. Preferably, such suction is effected by connecting the transporting tubes tightly to the containers and evacuating said containers.

The method mentioned above is especially suitable in machines for manufacturing cigars and the like as mentioned above, as such machines are always provided with a vacuum source, which latter has hitherto been adapted for other purposes than according to this invention. Therefore, no extensive constructive proceedings must be undertaken in such machines to effect the suction required. Thus, the construction is very much simplified. By using tubes for transporting the clippings, there is not needed such a large space as if open chutes are used, which fact is of great importance, as especially in cigar machines the space is very limited particularly beneath the cutting device. Moreover, by using tubes it is possible to arrange the channels for transporting in any way e. g. the tubes can be drawn practically independently of the development and disposing of other machine details. It is thus even possible to draw the tubes upwards in the direction of the air-current, if desired.

A preferred embodiment of the invention is shown in the accompanying drawings. Fig. 1 shows a vertical front elevation and partly a section of the device. Fig. 2 shows a vertical side elevation and partly a section. Fig 3 is a diagrammatic plan view of the suction ends of the transporting tubes and a horizontal section of the cutting device.

Tubes 2 and 3 for transporting the clippings are tightly fixed in a frame 1 at the lower side of which are fixed containers 4 and 5 at each of the lower ends of the tubes 2 and 3. Between the upper open ends of the tubes 2 and 3 is arranged a cutting device consisting of knives or scissor blades 6 and 7, one pair arranged on each side of a cigar holder 8 and in the neighbourhood of the aforesaid upper tube openings. The knives, the upper part of which only is shown, as they form no part of the invention, are arranged to approach towards each other and cut off the clippings of a cigar 9 pinched by the holder 8. Said holder, which also forms no part of the invention, consists of two pinches, the lower part of which is shown in the Figures 1 and 2.

In the embodiment of the invention shown in Figs. 1 and 2, the containers 4 are provided at their bottom with lids 10 connected to the containers at hinges 11 and provided with yielding pinches 12. Moreover, in the containers there are arranged openings 13, whereby they communicate through suction tubes 14 with a vacuum source. At the connection between the tubes 14 and the containers, there are arranged screens or strainers 16 pressed between a flanged coupling 15 and the wall of the container. According to Fig. 2 a shield 17 is arranged within the containers and fixed at the frame 1 by a flange bent at right angle to the other part of the shield, which depends below the level of the opening 13.

According to the invention, the cigar, cigarillo or bunch manufactured is seized by the pinches 8 and held in the position shown in Figs. 1-3 between the knives 6, 7, which are in open position as in Figs. 2 and 3. Then the ends of the cigar which project beyond the knives 6, 7 are cut off by the latter when they approach towards each other. The clippings thus obtained are then transferred into the upper openings of the tubes 2 and 3 by an air-current obtained thereby that the inner of containers 4 and 5 has a sub-atmospheric pressure. The clippings are transported through the tubes and fall down to the bottom of the containers, where they are collected. If the air-current tends to transfer the clippings directly from the transporting tubes to the suction openings 13, this is prevented by the shield 17, against which the clippings dash, whereup they fall down to the bottom of the container. If nevertheless lighter parts of tobacco leaves etc. pass the shield and tend to follow the air current through the suction tube 14, they are caught by the strainer 16. When a certain amount of clippings have been collected at the bottom of the containers, the latter can easily be emptied by opening the hinged lids 10, thus the clippings fall down out of the containers.

I do not wish to limit my invention as to the above described details of construction, as there are several other embodiments within the scope of the invention. Thus, as shown in Fig. 2, there are mouthpieces 18 inserted in the transporting tubes, and developed to work as ejectors, thereby effecting a suction at the upper openings of the tubes 2 and 3. If desired, the cutting and transporting device can be arranged to cut only one end of the cigars and transport the clippings obtained.

What I claim is:—

In a cigar machine in combination, a cutting device for clippings, a tightly closed container for said clippings, a vacuum conduit connected to said container, and a transporting tube leading from adjacent the side of said cutting device opposite the cigar being cut and tightly connected to said container.

KARL ERIK GRANSTEDT.